(12) United States Patent  (10) Patent No.: US 7,261,327 B1
Johnston  (45) Date of Patent: Aug. 28, 2007

(54) FISHING HOOK TYING APPARATUS

(76) Inventor: Howard Johnston, 9626 E. Kalil, Scottsdale, AZ (US) 85253

( * ) Notice: Subject to any disclaimer, the term of this patent is extended or adjusted under 35 U.S.C. 154(b) by 62 days.

(21) Appl. No.: 11/347,044

(22) Filed: Feb. 3, 2006

(51) Int. Cl.
  *D03J 3/00* (2006.01)
(52) U.S. Cl. ....................................................... 289/17
(58) Field of Classification Search .................. 289/17
  See application file for complete search history.

(56) References Cited

U.S. PATENT DOCUMENTS

| | | | |
|---|---|---|---|
| 2,242,341 A | 5/1941 | Brignall | |
| 2,394,807 A | 2/1946 | Robinson | |
| 2,570,575 A | 10/1951 | Lindbloom | |
| 2,648,364 A | 8/1953 | Corella | |
| 2,683,306 A | 7/1954 | Brignall | |
| 2,783,571 A | 3/1957 | Stilwell | |
| 2,926,036 A | 2/1960 | Wimberley | |
| 2,943,650 A | 7/1960 | Rubin | |
| 2,964,069 A | 12/1960 | Chappel et al. | |
| 3,131,732 A | 5/1964 | Thurston | |
| 3,396,998 A * | 8/1968 | Scoville | 289/17 |
| 3,402,957 A * | 9/1968 | Peterson | 289/17 |
| 3,494,385 A | 2/1970 | Hanigan | |
| 3,578,035 A | 5/1971 | Parker | |
| 3,695,311 A | 10/1972 | Hanigan | |
| 3,712,651 A | 1/1973 | Shockley | |
| 3,893,254 A | 7/1975 | Nack | |
| 4,064,610 A | 12/1977 | Murray | |
| 4,333,614 A | 6/1982 | Flax | |
| 4,714,281 A | 12/1987 | Peck | |
| 5,685,037 A | 11/1997 | Fitzner | |
| 5,791,699 A * | 8/1998 | High | 289/17 |
| 6,209,930 B1 | 4/2001 | Johnston | |
| 6,434,878 B1 * | 8/2002 | Milton | 43/4 |
| 2004/0004355 A1 * | 1/2004 | Beers | 289/17 |
| 2005/0116471 A1 * | 6/2005 | Muir et al. | 289/17 |

* cited by examiner

*Primary Examiner*—Shaun R. Hurley
(74) *Attorney, Agent, or Firm*—Parsons & Goltry; Robert A. Parsons; Michael W. Goltry

(57) ABSTRACT

Fishing hook tying apparatus includes a housing with a shaft mounted therein for rotation about the longitudinal axis. An end of the shaft protrudes from one end of the housing to form a chuck including resilient jaws and a longitudinally movable collar. The chuck is formed to grasp the shank of a fishing hook in a closed-jaws position and to release the fishing hook in an open-jaws position. A lanyard with a free end and an end attached to the shaft has a wound-position and an unwound-position. A spring is attached to the shaft and to the housing so as to produce a winding bias on the shaft when the lanyard is moved from the wound-position to the unwound-position. The winding bias tends to rotate the shaft from the unwound position of the lanyard to the wound position of the lanyard.

15 Claims, 5 Drawing Sheets

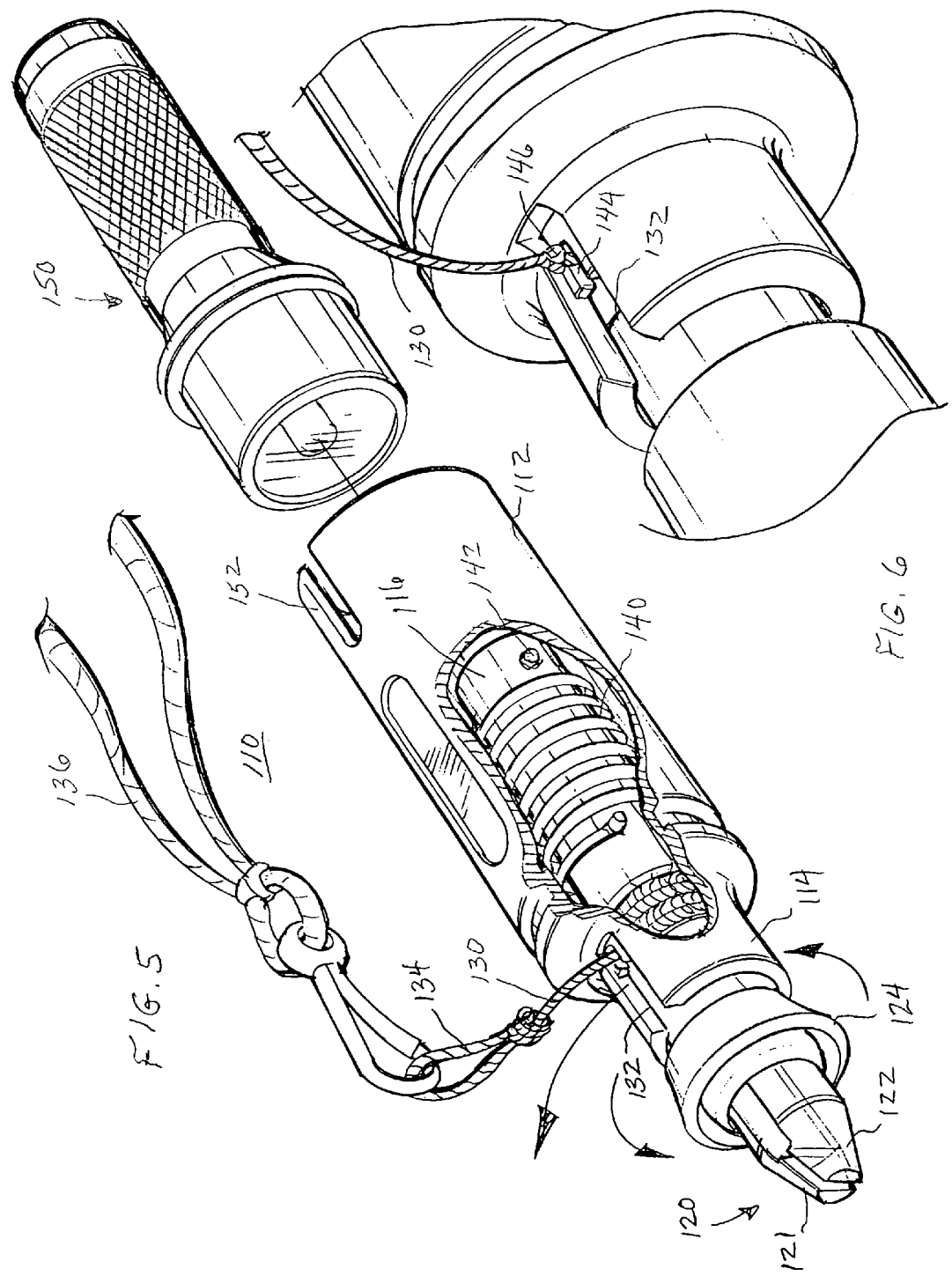

US 7,261,327 B1

FISHING HOOK TYING APPARATUS

FIELD OF THE INVENTION

This invention concerns angling accessories and, more particularly, a tool for wrapping the end of a fishing leader around a standing part of the leader for forming an eye that is part of an attachment knot.

BACKGROUND OF THE INVENTION

A fisherman is no better than his knots. It is no good to own the best tackle and have an abundance of fishing knowledge and skill if, when fish are hooked, knots give way. The angler must therefore pay close attention to his knots. Under most conditions, an angler needs to know how to tie only a few knots, one being the clinch knot. The clinch knot is favored among fly fisherman for tying flies to leader tippets. To tie the clinch knot, the end of the leader is passed through the hook-eye of a fishing hook and the end brought back and wrapped, normally four to ten times, around the standing part of the leader to form an eye in the leader at the hook-eye. After passing the leader end through the eye, the standing part of the leader and the leader end are pulled to form a knot drawn tightly against the hook-eye.

An issued United States patent, U.S. Pat. No. 6,209,930, issued Apr. 3, 2001, incorporated herein by reference, describes tying a clinch knot wherein an end of a line is passed through a hook-eye of a fishing hook with the end held adjacent a standing part of the line. The patent describes improved apparatus for wrapping the end of the line around the standing part comprising a drive element with greater control and flexibility, mounted to rotate in response to exertion of a force and a clamp carried by the drive element for holding the hook.

Accordingly, it is a purpose of the present invention to provide improved apparatus for wrapping the end of the line around the standing part that includes greater adjustment and flexibility.

SUMMARY OF THE INVENTION

The above problems and others are at least partially solved and the above objects and others realized in new and improved fishing hook tying apparatus. The apparatus includes a cylindrical housing with a longitudinal axis and a shaft rotatably mounted within the body for rotation about the longitudinal axis. An end of the shaft protrudes longitudinally outward from one end of the housing and forms a chuck including resilient jaws and a longitudinally movable collar having an open-jaws position and a closed-jaws position. The chuck is formed to grasp the shank of a fishing hook in the closed-jaws position and to release the fishing hook in the open-jaws position. A lanyard includes a first end extending outwardly through an opening in the housing and a second end attached to the shaft. The lanyard has a wound-position wherein a portion of the lanyard between the first and second ends is wound around the shaft and an unwound-position wherein the portion of the lanyard extends outwardly through the opening in the housing. A compression/tension spring is mounted between the shaft and the housing and attached to the shaft and to the housing so as to produce a winding bias on the shaft when the lanyard is moved from the wound-position to the unwound-position. The winding bias tends to rotate the shaft from the unwound position of the lanyard to the wound position of the lanyard.

Generally, the number of turns that the lanyard is wound around the shaft in the wound-position corresponds to the number of times the angler wishes to wrap an end of a line around a standing part of the line to form an eye in the line. In a preferred embodiment, the opening in the housing includes a lanyard latching slot formed and positioned to receive the lanyard therethrough. The lanyard has an obstruction therein, such as a knot, spaced from the second end and formed to latch in the latching slot and prevent winding movement of the lanyard toward the wound-position. The position of the obstruction along the lanyard corresponds to the number of times the angler wishes to wrap an end of a line around a standing part of the line to form an eye in the line.

Also in a preferred embodiment, a flashlight is attached to an end of the housing opposite the chuck so as to emit light longitudinally through the housing and onto the chuck. The chuck, for example, can be formed of transparent or translucent material that conducts light emitted from the flashlight so as to illuminate the chuck and captured fishing hook for the angler when convenient.

BRIEF DESCRIPTION OF THE DRAWINGS

The foregoing and further and more specific objects and advantages of the invention will become readily apparent to those skilled in the art from the following detailed description taken in conjunction with the drawings in which:

FIG. 5 is an isometric view of an embodiment of apparatus for wrapping an end of a line around a standing part of the line for forming an eye in the line as part of an attachment knot in accordance with the present invention; and FIG. 6 is an enlarged isometric view of a portion of the apparatus of FIG. 5.

DETAILED DESCRIPTION OF THE DRAWINGS

Figure 1:
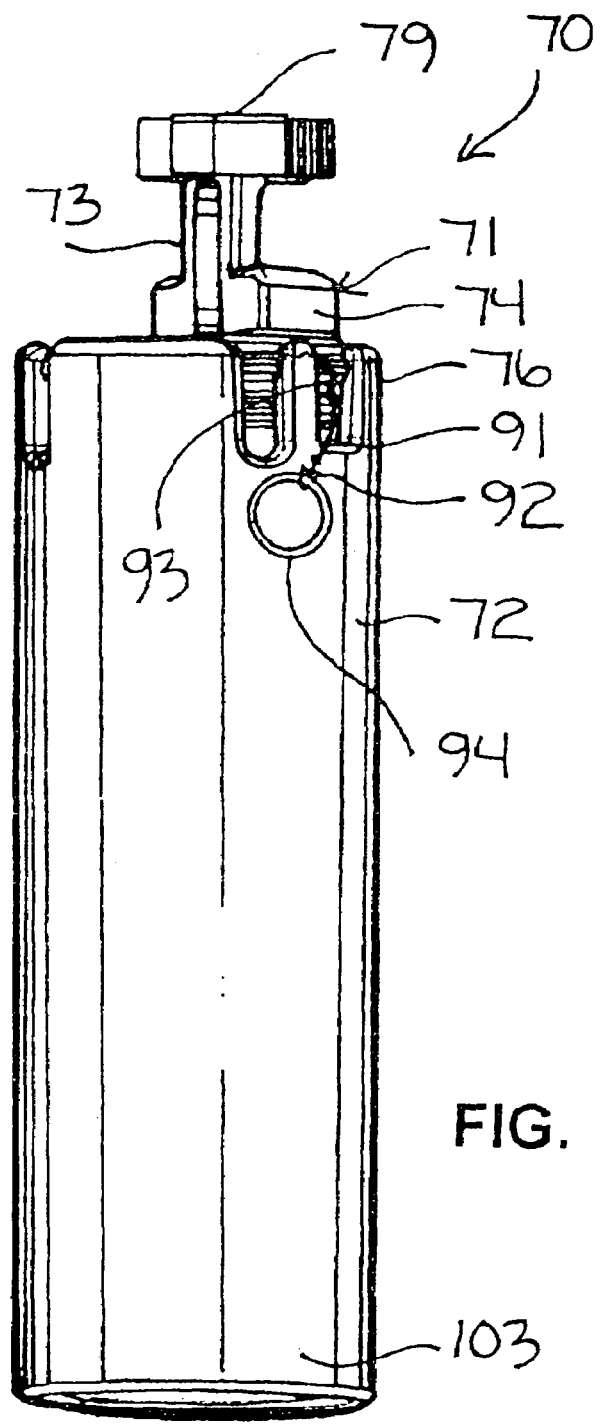
FIG. 1 is an isometric view of prior art apparatus for wrapping an end of a line around a standing part of the line for forming an eye in the line as part of an attachment knot.
Figure 2:
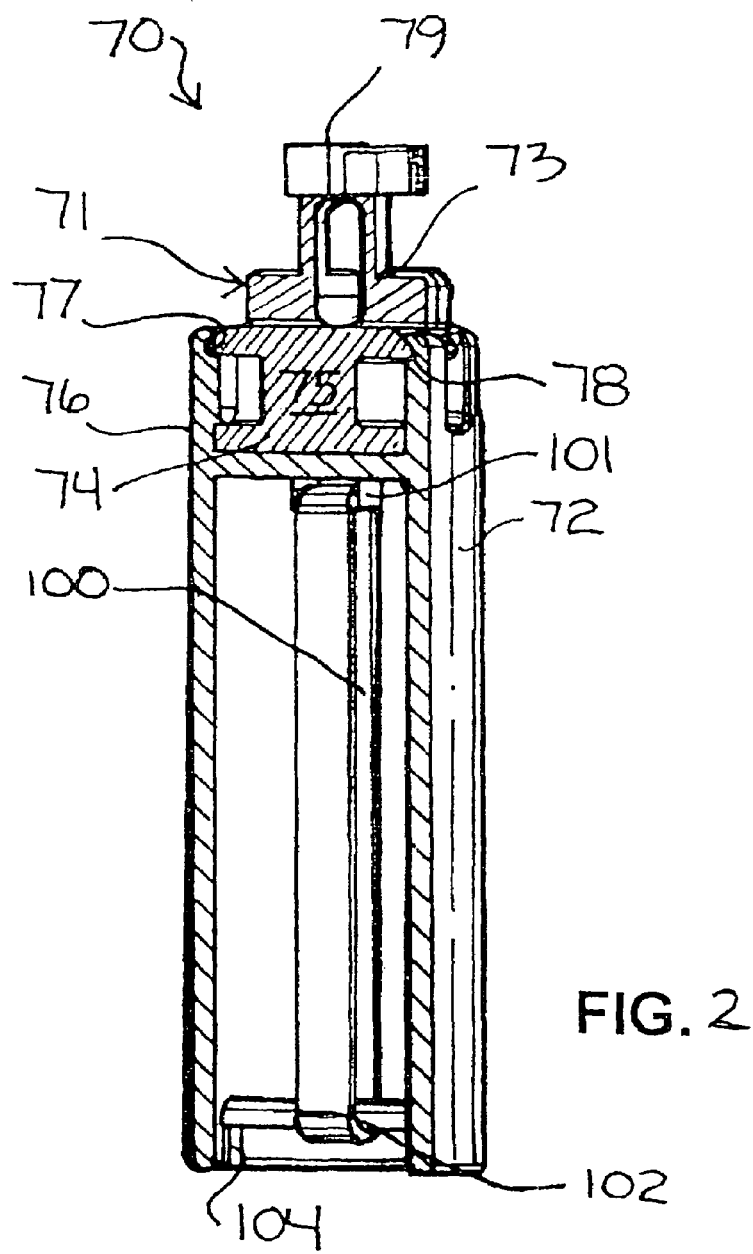
FIG. 2 is a vertical sectional view of the apparatus of FIG. 1.
Figure 3:
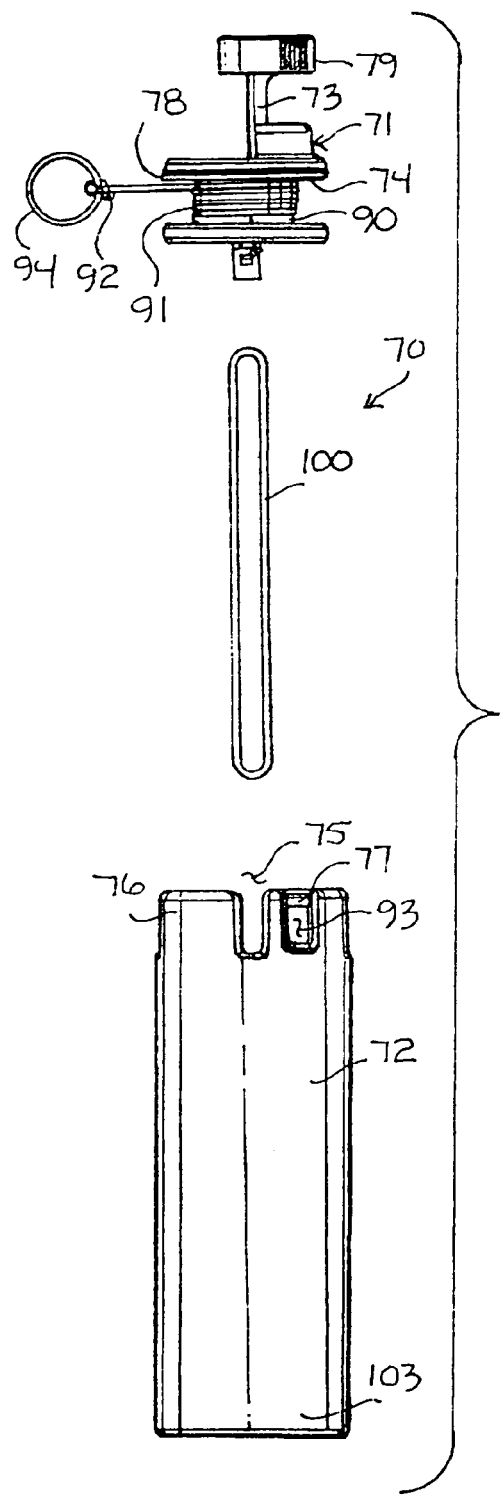
FIG. 3 is an exploded view of the apparatus of FIG. 1.
Figure 4:
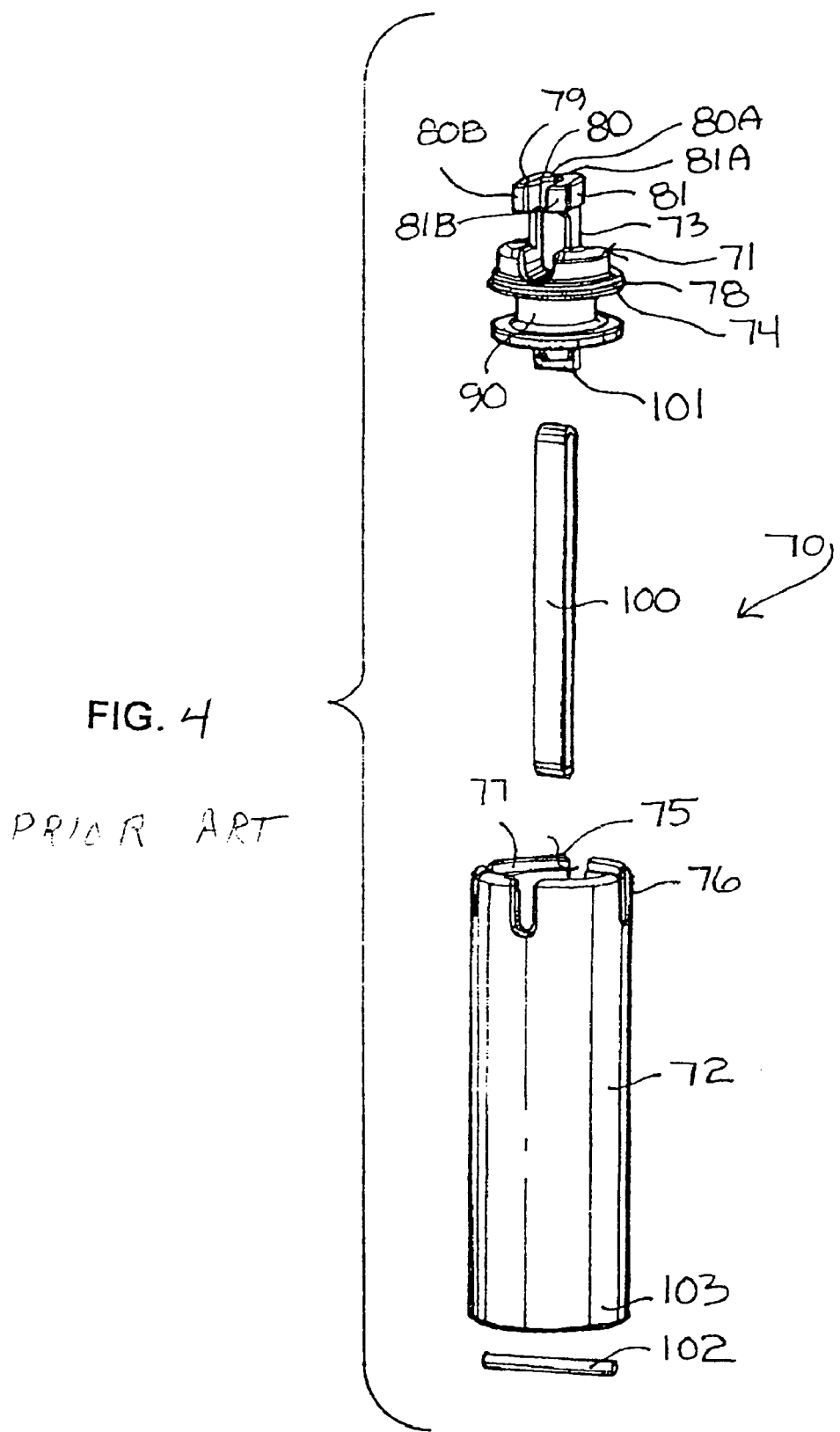
FIG. 4 is another exploded view of the apparatus of FIG. 1.

Turning to the drawings, attention is first directed to FIG. 1, which illustrates a prior art embodiment, designated 70, of apparatus for wrapping the end of the line around its standing part for forming an eye in the line as part of an attachment knot. Apparatus 70 comprises a drive element 71 carried by a body, grip or housing 72 for axial rotation relative to and within body 72. Referring additionally to FIGS. 2-4, in this embodiment drive element 71 comprises an extension 73 that extends outwardly from a base 74 and terminates with, and carries, a clamp 79 for holding a fishing hook. Base 74 rests in a pocket 75 of housing 72 located adjacent an end 76 thereof. An annular groove 77 formed into housing 72 adjacent end 76 matingly receives an annular tongue 78 of base 74 that holds base 74 to housing 72 for relative rotation.

Referring specifically to FIG. 4, clamp 79 includes jaws 80 and 81 mounted with extension 73 for movement between a normal closed condition as shown for holding a hook between their distal or outer ends 80A and 81A, respectively, and an open condition. A biasing element (not shown), such as a compression spring, captured between the jaws 80 and 81 normally holds them in the closed condition. To move jaws 80 and 81 into the open condition, the first and second jaws 80 and 81 include proximal or inner ends 80B and 81B that may be grasped and pushed together.

Referring again to FIG. 3, base 74 defines an annular recess 90 located adjacent annular tongue 78. A flexible lanyard 91 is carried or supported by this annular recess 90 in a normally wound condition as shown and terminates with a free end 92 movable away from the drive element 71 for imparting a rotation to drive element 71. As shown in FIG. 3, housing 72 defines a window 93 that free end 92 of lanyard 91 extends through. A stop 94, herein illustrated as a pull-ring, carried by free end 92 prevents free end 92 from inadvertently receding into pocket 75 through window 93.

In operation, an angler moves the jaws 80 and 81 into the open condition, places the bend of a fishing hook between distal ends 80A and 81A and then allows jaws 80 and 81 to return to the closed condition to seize or capture the bend of the fishing hook between the distal ends 80A and 81A. So captured, the shank of the hook should extend outwardly from distal ends 80A and 81A and terminate with the hook-eye. The angler then passes the end of a line, such as a leader or tippet, into and through the hook-eye and holds the end adjacent a standing part of the line with one of his hands. To wrap the end of the line around its standing part, the angler, with his other hand, grasps housing 72 and, with free end 92 of lanyard 91 held between his teeth or fastened to his fishing jacket or shirt, moves housing 72 away from free end 92. In so doing, flexible lanyard 91 unwinds from drive element 71 which imparts a relative rotation to carrier 71. This rotation turns clamp 79 and the hook it holds, wrapping the end of the line successively around its standing part as the angler imparts this rotational force to the drive element 71. The wrapping of the line about itself forms an eye in the line adjacent the hook-eye comprising a part of an attachment knot, such as a clinch knot. To complete the clinch knot, the angler passes the end of the line through the eye and, by pulling the standing part and the end of the line, tightly draws the clinch knot against the hook-eye. After trimming excess line from the base of the knot, the angler may release the hook from the clamp 79 and assume his craft of fishing.

Drive element 71 and housing 72 cooperate to support an elastic band 100 that, in this specific example, is supported in a stretch condition. Elastic band 100 is supported by and between a hook 101 carried by base 74 extending into housing 72 away from clamp 79 and a retaining post or bar 102 supported at its ends in slots 104 and 105 formed into housing 72 adjacent an end 103 thereof that opposes end 76 as shown in FIG. 2. Because elastic band 100 is normally supported by hook 101 and post 102 in a stretched condition, post 102 is securely held in slots 104 and 105. However, when elastic band 100 requires replacement, the ends of post 102 may be easily removed from slots 104 and 105 for replacing the old elastic band with a new one.

Elastic band 100 normally biases drive element 71 in what is considered an unwound or starting condition characterized by flexible lanyard 91 oriented in its wound condition about annular recess 90. From this unwound or starting condition, movement of housing 72 away from free end 92 of flexible lanyard 91 into what is considered a wound or ending condition of drive element 71 completes the winding of the end of the line around its standing part. Furthermore, from its unwound to wound condition, drive element 71 and the length of flexible lanyard 91 may be constructed to offer four, five or other selected number of turns of the end of the line around its standing part as desired by the angler.

Turning now to FIG. 5, an embodiment is illustrated of apparatus, designated 110, for wrapping an end of a line around a standing part of the line for forming an eye in the line as part of an attachment knot in accordance with the present invention. Apparatus 110 includes an elongated cylindrical body or housing 112 with an end 114 necked axially inward to rotatably mount a central shaft 116 substantially within housing 112 for rotation about the longitudinal axis of housing 112. Shaft 116 extends coaxially a substantial portion of housing 112 and terminates beyond end 114 in a chuck 120.

The protruding end of chuck 120 is bifurcated into a pair of opposing resilient jaws 121 and 122 designed to receive the shank of a fishing hook (not shown) therebetween. A collar 124 is coaxially mounted around chuck 120 for limited longitudinal movement therealong. Further, the diameter of chuck 120 increases slightly from a position adjacent end 114 toward resilient jaws 121 and 122. Thus, when collar 124 is in a normal position adjacent end 114 of housing 112, jaws 121 and 122 are open or spaced apart and in a hook receiving orientation. To clamp a hook between jaws 121 and 122, an angler simply places the shank of the hook between jaws 121 and 122, with the eye of the hook substantially on the longitudinal axis of central shaft 116, and moves collar 124 longitudinally toward jaws 121 and 122, forcing jaws 121 and 122 together, until the hook is tightly clamped. To unclamp the hook, the angler simply moves collar 124 back toward end 114 of housing 112.

A lanyard 130 has one end anchored in shaft 116 with the central portion wound around shaft 116 within housing 112 and adjacent end 114 of housing 112. An opposite end of lanyard 130 extends outwardly from body 112 through a slot or aperture 132 and is formed into a loop 134 with some kind of convenient carrying device 136 attached. In this embodiment, for example, carrying device 136 is a loop of soft rope that can be placed around an angler's neck for convenient carrying of apparatus 110. Lanyard 130 is long enough to extend around shaft 116 generally from four to ten times, depending upon the number of times the angler wishes to wrap an end of a line around a standing part of the line to form an eye in the line. The wound position of lanyard 130 is illustrated in FIG. 5.

A spiral wound compression/tension spring 140 is positioned coaxially around shaft 116 with one end 142 anchored in shaft 116 for rotation therewith and the other end anchored in the inner surface of body 112. Thus, as lanyard 130 is pulled outwardly from the wound position (shown in FIG. 5), spring 140 is tightened around shaft 116 to bias lanyard 130 back into the wound position.

Referring additionally to FIG. 6, slot 132 has a much smaller lanyard latching slot 144 formed in the inner end thereof. Latch slot 144 is sufficiently small that an obstruction attached to lanyard 130, such as a simple overhand knot 146 formed in lanyard 130, is caught and prevents lanyard 130 from returning to the wound position. In practice, the angler forms knot 146 in lanyard 130 at a point along lanyard 130 that provides the number of turns of shaft 116 corresponding to the number of times the angler wishes to wrap an end of a line around a standing part of the line to form an eye in the line.

Thus, to tie the desired knot in the fishing line, the angler simply pulls lanyard 130 until knot 146 can be anchored in latch slot 144. The angler then places the shank of a hook in chuck 120, as explained above and passes the end of a line, such as a leader or tippet, into and through the hook-eye and holds the end adjacent a standing part of the line with one of his hands. To wrap the end of the line around its standing part, the angler, simply releases knot 146 from latch slot 144. In so doing, lanyard 130 moves from the unwound to the wound position under the bias of spring 140 which imparts a relative rotation to clamp 120. This rotation turns clamp 120 and the hook it holds, wrapping the end of the line successively around its standing part. The wrapping of the line about itself forms an eye in the line adjacent the hook-eye comprising a part of an attachment knot, such as a clinch knot. To complete the clinch knot, the angler passes the end of the line through the eye and, by pulling the standing part and the end of the line, tightly draws the clinch knot against the hook-eye. After trimming excess line from the base of the knot, the angler releases the hook from clamp 120 and assumes his craft of fishing.

It will be noted that because lanyard 130 moves from the unwound to the wound position with no effort required by the angler, the process is greatly simplified. Alternatively, the angler could arrange the hook and line as described above and then pull on lanyard 130, moving it from the wound to an unwound position and thereby wrapping the end of the line successively around its standing part during the unwinding of lanyard 130.

A small battery operated flashlight 150 is designed to be inserted coaxially into end 152 of body 112 opposite end 114. Flashlight 150, when energized, emits light longitudinally past central shaft 116 and onto chuck 120 and collar 124. In this embodiment, both chuck 120 and collar 124 are formed of light conducting (either transparent or translucent) material, such as plastic or the like. Thus, light emitted from flashlight 150 passes through chuck 120 and collar 124 to light the area in which a fishing hook is clamped between jaws 121 and 122. This light can greatly aid an angler during any condition in which there is insufficient light to enable the angler to see the knot being tied.

Thus, it can be seen that improved fishing hook tying apparatus has been disclosed in which the hook grasping structure is substantially improved. Further, the structure for wrapping the end of the line successively around its standing part is substantially improved so that an angler can perform the operation relatively simply. For example, knot 146 in lanyard 130 can be released from latch slot 144 with the same hand that is holding body 112 of apparatus 110, which greatly simplifies the operation. Alternatively, the loop of soft rope (carrying device 136) is placed around the angler's neck and the angler simply moves body 112 sufficiently to disengage knot 146 from latch slot 144. In either case, the operation is a simple two-handed procedure.

Various changes and modifications to one or more of the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is.

What is claimed is:

1. Fishing hook tying apparatus comprising:
    a cylindrical housing with a longitudinal axis and a shaft rotatably mounted within the body for rotation about the longitudinal axis;
    an end of the shaft protruding longitudinally outward from one end of the housing, the end of the shaft forming a chuck including resilient jaws and a longitudinally movable collar having an open-jaws position and a closed-jaws position, the chuck being formed to grasp the shank of a fishing hook in the closed-jaws position and to release the fishing hook in the open-jaws position;
    a lanyard including a first end extending outwardly through an opening in the housing and a second end attached to the shaft, the lanyard having a wound-position wherein a portion of the lanyard between the first and second ends is wound around the shaft and an unwound-position wherein the portion of the lanyard extends outwardly through the opening in the housing; and
    a compression/tension spring mounted between the shaft and the housing and attached to the shaft and to the housing so as to produce a winding bias on the shaft when the lanyard is moved from the wound-position to the unwound-position, the winding bias tending to rotate the shaft from the unwound position of the lanyard to the wound position of the lanyard.

2. Fishing hook tying apparatus as claimed in claim 1 wherein the opening in the housing includes a lanyard latching slot formed and positioned to receive the lanyard therethrough, the lanyard having an obstruction therein spaced from the second end and formed to latch in the latching slot and prevent winding movement of the lanyard toward the wound-position.

3. Fishing hook tying apparatus as claimed in claim 2 wherein the obstruction in the lanyard includes a knot positioned at a point along the lanyard that provides the number of turns of the shaft corresponding to the number of times the angler wishes to wrap an end of a line around a standing part of the line to form an eye in the line.

4. Fishing hook tying apparatus as claimed in claim 1 wherein a flashlight is attached to an end of the housing opposite the one end so as to emit light longitudinally through the housing and onto the chuck.

5. Fishing hook tying apparatus as claimed in claim 4 wherein the chuck is formed of one of transparent and translucent material that conducts light emitted from the flashlight.

6. Fishing hook tying apparatus comprising:
    a cylindrical housing with a longitudinal axis and a shaft rotatably mounted within the body for rotation about the longitudinal axis;
    an end of the shaft protruding longitudinally outward from one end of the housing, the end of the shaft forming a chuck including a pair of bifurcated resilient jaws and a longitudinally movable collar having an open-jaws position and a closed-jaws position, the chuck being formed to grasp the shank of a fishing hook in the closed-jaws position and to release the fishing hook in the open-jaws position;
    a lanyard including a first end extending outwardly through an opening in the housing and a second end attached to the shaft, the lanyard having a wound-position wherein a portion of the lanyard between the first and second ends forms at least four turns wound around the shaft and an unwound-position wherein the portion of the lanyard extends outwardly through the opening in the housing; and
    a compression/tension spring mounted between the shaft and the housing and attached to the shaft and to the housing so as to produce a winding bias on the shaft when the lanyard is moved from the wound-position to the unwound-position, the winding bias tending to rotate the shaft from the unwound position of the lanyard to the wound position of the lanyard.

7. Fishing hook tying apparatus as claimed in claim 6 wherein the opening in the housing includes a lanyard latching slot formed and positioned to receive the lanyard therethrough, the lanyard having an obstruction therein spaced from the second end and formed to latch in the latching slot and prevent winding movement of the lanyard toward the wound-position.

8. Fishing hook tying apparatus as claimed in claim 7 wherein the obstruction in the lanyard includes a knot positioned at a point along the lanyard that provides the number of turns of the shaft corresponding to the number of times the angler wishes to wrap an end of a line around a standing part of the line to form an eye in the line.

9. Fishing hook tying apparatus as claimed in claim 6 wherein a flashlight is attached to an end of the housing opposite the one end so as to emit light longitudinally through the housing and onto the chuck.

10. Fishing hook tying apparatus as claimed in claim 9 wherein the chuck is formed of one of transparent and translucent material that conducts light emitted from the flashlight.

11. A method of tying a fishing hook to a line comprising the steps of:
  providing a cylindrical housing with a shaft rotatably mounted within the body for rotation therein, an end of the shaft protruding from one end of the housing and forming a chuck including with resilient jaws and a collar movable between an open-jaws position and a closed-jaws position, a lanyard attached to the shaft and having a wound-position and an unwound-position, and a spring attached to the shaft and to the housing so as to produce a winding bias on the shaft when the lanyard is moved from the wound-position to the unwound-position;
  placing the shaft of a fishing hook in the jaws of the chuck with the collar in the open-jaws position, situating an eye of the fishing hook substantially in a rotation axis of the shaft, and moving the collar into the closed-jaws position;
  pulling the lanyard from the wound-position toward the unwound-position to rotate the shaft a desired number of times;
  inserting a free end of the line through the eye of the fishing hook and holding the free end of the line;
  releasing the lanyard to allow the shaft to return to the wound-position of the lanyard while holding the free end of the line to wrap the free end of a line around a standing part of the line to form an eye in the line; and
  inserting the free end of the line through the eye in the line and tightening the line into a knot tying the fishing hook to the line.

12. A method as claimed in claim 11 wherein the step of providing further includes providing a lanyard latching slot in the housing positioned to receive an obstruction in the lanyard to latch the lanyard at a point along the lanyard that provides a number of turns of the shaft corresponding to a number of times the angler wishes to wrap the free end of the line around a standing part of the line to form an eye in the line.

13. A method as claimed in claim 11 wherein the step of providing further includes providing a lanyard latching slot in the housing and the method further including a step of forming a knot in the lanyard at a point along the lanyard that provides a number of turns of the shaft corresponding to a number of times the angler wishes to wrap the free end of the line around a standing part of the line to form an eye in the line and the step of pulling the lanyard further includes latching the knot in the latching slot to hold the lanyard in the unwound-position.

14. A method as claimed in claim 11 wherein the step of providing further includes attaching a flashlight to the housing adjacent the end opposite the chuck so that light emitted by the flashlight is directed through the housing and onto the chuck.

15. A method as claimed in claim 14 wherein the step of providing further includes forming the chuck of one of transparent and translucent material so that light emitted by the flashlight is directed through the chuck and onto a captured fishing hook.

* * * * *